3,449,429
COUPLING OF AMINO ARENES
Wayne L. Carrick, East Brunswick, and George L. Karapinka, Irvington, N.J., assignors to Union Carbide Corporation, a corporation of New York
No Drawing. Original application Sept. 30, 1963, Ser. No. 312,346, now Patent No. 3,322,838, dated May 30, 1967. Divided and this application Nov. 7, 1966, Ser. No. 592,337
Int. Cl. C07c 87/28, 87/50, 87/48
U.S. Cl. 260—576  9 Claims This is a division of application Ser. No. 312,346, filed Sept. 30, 1963, now U.S. Patent No. 3,322,838.

This invention relates to a novel process for coupling substituted arenes. More particularly, it relates to an oxidative coupling process effected with transition metal oxidizers.

The term "arene" is the generic name of monocyclic and polycyclic aromatic hydrocarbons as defined by the International Union of Pure and Applied Chemistry in the 1957 Report of the Commission on the Nomenclature of Organic Chemistry published in the Journal of the American Chemical Society, vol. 82, p. 5545, Nov. 5, 1960.

Bifunctional biarenes, i.e., compounds containing 2 arene moieties each having a functional substituent are useful for the preparation of addition and condensation polymers. The bis(hydroxyphenyl) alkanes for example, are used as comonomers for the preparation of polycarbonates, polyhydroxyethers, epoxy resins, phenolic resins and many other polymers. The 4,4'-dihydroxybiphenyls also are useful for the preparation of such polymers inasmuch as the biphenyl structure would impart increased stiffness, toughness and higher melting points to these polymers. However, commercial application of these biphenyls is severely handicapped by the unavailability of an economical, direct method for their synthesis.

Another class of bifunctional arenes of wide and variable utility is the diamino biphenyls which can be used as precursors for the synthesis of polyureas, polyurethanes and other polymers and as curing agents for the preparation of thermoset epoxy resins.

An object of this invention is to provide a direct process for the preparation of bifunctional biarenes.

Another object is to provide dihydroxy biarenes.

A further object is to provide diamino biarenes.

Other objects of this invention will become apparent to those skilled in the art upon the examination of the detailed explanation below.

It has now been discovered that arenes containing electropositive substituents can be coupled by contact with transition metal oxidizers. These oxidizers are in general, halogen containing compounds of transition metals of Groups IVb and Vb of the Deming Periodic Classification of Elements, found on p. 312 of the Handbook of Chemistry and Physics, 29th edition, 1945, Chemical Rubber Publishing Company, Cleveland, Ohio.

In addition, the oxygenated halides of the metals of Group Vb are effective as well in this coupling reaction. The chlorides are preferred to other halides because of their activity and commercial availability.

The choice of metal to be used in the oxidizer depends on the electropositive substituent on the arene substrate to be coupled. Thus, with hydroxy substituted arenes, the halides and oxyhalides of the metals of Group Vb are preferred, whereas with amino substituted arenes either Group IVb or Vb halides and Vb oxyhalides can be used. While titanium is a preferred metal of Group IVb, zirconium can also be used. Similarly, vanadium is a preferred metal of Group Vb but columbium can also be used. Specific oxidizers include titanium tetrachloride, vanadium tetrachloride, vanadium oxytrichloride, and the like.

It is within the contemplation of this invention to include the other halides of Ti and V other than those described above, although they are not as economical as the chlorides. Such halides include vanadium tetrafluoride, vanadium pentafluoride, vanadium oxytribromide, titanium tetraiodide, titanium tetarbromide, titanium tetrafluoride and the like.

It has been found that the higher valence states of the metals used are singularly effective in this coupling reaction although the exact valence varies with the compound in which the metal is used. Thus, for example, vanadium has a valence of +4 in vanadium tetrachloride and +5 in vanadium oxytrichloride. In the case of titanium, halides having a valence of +4 as found, for example, in titanium tetrachloride appear to be particularly active.

The compounds which serve as substrates in this oxidative coupling reaction can be represented by the formula $$(R)_x\text{—Ar—Q}$$

wherein each R is an alkyl group having from 1 to 9 carbon atoms, $x$ is an integer from 0 to 2 inclusive, Ar is an arene radical having at least one reactive site in the positions ortho and para to the substituent Q group and Q is a monovalent radical derived from hydroxyl, monoalkylamino, dialkylamino, aminoaryl, and diarylamino groups.

Alkyl radicals which can serve as R substitutents include, methyl, ethyl, propyl, butyl, pentyl, hexyl, heptyl, octyl, nonyl, isopropyl, neopentyl radicals and the like.

Arene radicals which can be used in this invention are those derived from such arenes as benzene, naphthalene, anthracene, phenanthrene, indene, fluorene and the like. Benzene and naphthalene are preferred arenes in this invention.

This oxidative coupling reaction can be carried out in the presence of a variety of inert liquid diluents such as aromatic hydrocarbons, e.g., benzene, toluene and xylene; ethers, e.g., diethyl ether, dipropyl ether, dibutyl ether, and diisobutyl ether; halogenated hydrocarbons, e.g., carbon tetrachloride, trichloroethylene, tetrachloroethylene, and tetrachloroethane and the like. Although the inert liquid diluent usually serves as a solvent for the reactants, it is not essential and may be omitted from the reaction if desired.

A useful temperature range for this reaction extends from about −10° C. to 150° C. Temperature is not narrowly critical insofar as the coupling reaction itself is concerned. Reaction temperature should be considered, however, where the position of coupling is important. Thus, in the temperature range from −5° C. to about 80° product coupling at the para position is predominant. At about 120° C. and higher both the ortho and para positions of the substrate are involved.

For example, when phenol was coupled with vanadium tetrachloride in the −5° C. to 80° C. range, the product was essentially 4,4'-dihydroxybiphenyl.

When phenol was reacted at about 120° C. in the presence of either vanadium oxytrichloride or vanadium tetrachloride, 2,4'-dihydroxybiphenyl was the major product and 4,4'-dihydroxybiphenyl the minor product.

The preferred reaction temperature for producing exclusively para coupled products is about 20° C. to about 40° C. although essentially similar results are obtained at about −5° C. to 80° C. This was demonstrated by a material balance study when phenol was used as a substrate which accounted for 95% of the phenol charged as either being converted to 4,4'-dihydroxybiphenyl in a yield of about 50% or recovered as unreacted phenol.

This study also indicated that with coupling reactions carried out at about −5° C. to 80° C. side reactions are negligible. It becomes apparent that this invention permits the recovery of unreacted phenol for reuse and conversion to the desired end product with virtually no waste due to by-product formation.

In carrying out this invention the pressures are usually atmospheric although superatmospheric and subatmospheric temperatures may also be utilized if desired. The mole ratio of aromatic hydrocarbon substrates to oxidizer is not narrowly critical as evinced by the fact that essentially the same yields of coupled products were obtained over a range of 4:1 to 1:4.

This novel oxidative coupling reaction may be described graphically by the following equation for the preparation of 4,4'-dihydroxybiphenyl:

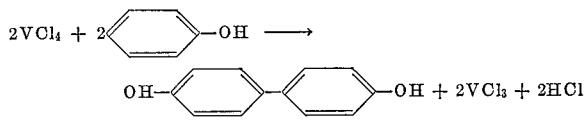

In the coupling reaction the transition metal compound is reduced in valence. The resulting lower valence metal compounds can be reoxidized to the higher valence compounds and be reused for coupling more of the organic compounds, thus setting up a cyclic process which utilizes the transition metal compounds more efficiently.

It is obvious that various changes and modifications may be made in the illustrated embodiments without departing from the nature and spirit thereof.

The following examples in which all percentages are by weight are illustrative of this invention and are not intended to indicate ranges of operation.

Example 1.—Preparation of 4,4'-dihydroxybiphenyl

The reaction apparatus consisted of a 250 ml. 2-neck, round bottom flask equipped with a magnetic stirrer. One neck of the flask was connected to a bubble counter filled with $CCl_4$ and the other plugged with a serum stopper. The flask was charged with a 3.8 g. of distilled phenol and 100 ml. of dry $CCl_4$. After purging the system with nitrogen, stirring was started and 40 mmol. of $VCl_4$ in 15 ml. of $CCl_4$ was introduced into the flash through the serum stopper with a hypodermic syringe. The reaction mixture turned dark, a vigorous evolution of HCl ensued and an insoluble dark residue formed. An exotherm of about 10° C. accompanied this reaction. The evolution of 1 N $H_2SO_4$ was added to decompose the intermediate reaction products formed resulting in the formation of a green-blue acidic aqueous layer, a colorless $CCl_4$ layer and a white crystalline solid at the interface. The white solid was separated from the reaction mass by filtration, washed with water and dried. This product, 4,4'-dihydroxybiphenyl, amounting to 1.7 g. (46% yield), had a M.P. of 275–278° C. after recrystallization from ethanol. (Literature M.P. 275° C.—Handbook of Chemistry and Physics.)

The aqueous layer was separated and rendered alkaline with 10% aqueous NaOH precipitating a vanadium compound which was isolated by filtration. The filtrate was acidified with concentrated hydrochloric acid and extracted with ether. The ether extracts were evaporated to dryness and the residue washed with two 50 ml. portions of hot water. Unreacted phenol ioslated from the water washings amounted to 0.90 g.

The $CCl_4$ layer from above was extracted with an aqueous 10% NaOH solution. The extract when treated as in the previous paragraph afforded an additional 0.76 g. of unreacted phenol.

Example 2.—4,4'-dihydroxybiphenyl

A series of experiments was carried out as in Example 1, using varying ratios of phenol to vanadium tetrachloride. The effect on the yield of 4,4'-dihydroxybiphenyl was slight as demonstrated in table below:

TABLE

| Phenol | | $VCl_4$ | | 4,4,-dihydroxybiphenyl | |
| --- | --- | --- | --- | --- | --- |
| G. | millimoles | G. | millimoles | G. | millimoles |
| 3 | 32 | 5.3 | 28 | 1.1 | 5.9 |
| 6 | 64 | 5.3 | 28 | 1.2 | 6.5 |
| 10 | 106 | 5.3 | 28 | 1.2 | 6.5 |
| 3 | 32 | 10.6 | 56 | 1.3 | 7.0 |

Example 3.—4,4'-dihydroxybiphenyl

The procedure described in Example 1 was followed with 2 g. of phenol and 4.2 g. of $VCl_4$ with the exception that 75 ml. of benzene was substituted for $CCl_4$ as the reaction solvent. After a reaction time of 20 minutes the reaction was quenched with 4 ml. of water which resulted in the deposition of a green paste on the side of the vessel. After removal of the hydrocarbon solvent, the paste was slurried with water which extracted the vanadium compounds leaving 0.5 g. of a white residue, 4,4'-dihydroxybiphenyl.

Example 4.—N,N,N',N'-tetramethylbenzidine

In the apparatus described in Example 1 was placed 100 ml. of dry $CCl_4$ and 5.1 ml. (40 millimoles) of distilled N,N-dimethylaniline. After purging the system with nitrogen, stirring was initiated and a solution of 40 millimoles of $VCl_4$ in 15 ml. of $CCl_4$ was added. A dark precipitate formed immediately. The reaction mixture was stirred for one hour and then hydrolyzed with 100 ml. of 1 N $H_2SO_4$. The aqueous layer was removed in a separatory funnel and rendered alkaline with 10% aqueous NaOH solution. The dark green residue which formed was filtered, washed with water and dried. This residue was then extracted with ether in a Soxhlet extraction apparatus for two days. Evaporation of the ether afforded 2.2 g. of N,N,N',N'-tetramethylbenzidine, (46% yield) M.P. 194° C. (after crystallization from ethanol). (M.P. 198° C.—Beilstein, XIII, p. 221.)

Example 5.—N,N,N',N'-tetramethylbenzidine

The procedure described in Example 4 was employed with 100 ml. of cyclohexane, 9.5 g. of dimethylaniline and 5 g. of titanium tetrachloride. After recrystallization from methanol 0.2 g. of N,N,N',N'-tetramethylbenzidine was obtained, M.P. 194° C.

Example 6.—N,N,N',N'-tetramethylbenzidine

The procedure described in Example 4 was employed with 100 ml. of cyclohexane, 2.9 g. of demethylaniline and 17.3 g. of titanium tetrachloride. After recrystallization from methanol 0.2 g. of N,N,N',N'-tetromethylbenzidine was obtained, M.P. 194° C.

Example 7.—4,4'-dihydroxybinaphthyl

In the apparatus described in Example 1 was placed a charge consisting of 2.0 g. (13 millimoles) of 1-naphthol of 50 ml. of dry benzene. After purging the system with nitrogen, 1 ml. (10.5 millimoles) of $VOCl_3$ was introduced into the reactor with a hypodermic syringe through the rubber seal stopper. A vigorous evolution of HCl ensued with the formation of a dark residue. The mixture was stirred for 15 minutes after which 50 ml. of 1 N $H_2SO_4$ was added to the reactor. The acidic layer became blue and a white crystalline residue settled out of solution. This residue following filtration and drying amounted to 0.92 g. (56% yield of 4,4'-dihydroxybinapthyl, M.P. 297–299° C. after crystallization from ethanol). (Literature M.P. 300° C. Handbook of Chemistry and Physics.)

Example 8.—2,2'-dihydroxybinaphthyl

The procedure of Example 7 was followed with 3.0 g. of 2-naphthol, 1.8 g. $VOCl_3$ and 60 ml. of benzene. A yield of 2.0 g. (65%) of 2,2'-dihydroxybinaphthyl (M.P. 217–218° C.) was obtained. (Literature M.P. 218° C.—Handbook of Chemistry and Physics.)

Example 9.—Preparation of 3,3'-dimethyl-4,4'-dihydroxybiphenyl

The procedure of Example 1 was followed with 5.2 g. of o-cresol, 7.7 g. of VCl$_4$, and 100 ml. of CCl$_4$. A yield of 1.1 g. (26%) of 3,3'-dimethyl-4,4'-dihydroxybiphenyl (M.P. 160–161° C.) was obtained. (Literature M.P. 160–161° C.—Beilstein.)

Example 10.—Preparation of 3,3',5,5'-tetramethyl-4,4'-dihydroxybiphenyl

The procedure of Example 1 was followed with 4.9 g. of 2,6-xylenol, 7.7 g. of VCl$_4$, and 100 ml. of CCl$_4$. A yield of 0.3 g. of 3,3',5,5'-tetramethyl-4,4'-dihydroxybiphenyl (M.P. 218–220° C.) was obtained. (Literature M.P. 223–225° C., B. O. Lindgren, Acta Chem. Scand., 14, 1203, 1960.)

Example 11.—Preparation of 2,4'-dihydroxybiphenyl

The reaction apparatus consisted of a 100 ml. 3-neck, round bottom flask equipped with a heater and a magnetic stirrer. One neck of the flask was connected to a bubble counter filled with CCl$_4$, while the other two necks were fitted with a thermometer and a stopper. After 60 g. of phenol was placed in the flask, the flask was heated to 110° C. Nitrogen was then introduced. After purging the system with nitrogen for 15 minutes, the temperature was lowered to 60° C., stirring was started, and 10 ml. of VOCl$_3$ was introduced dropwise via a hypodermic syringe over a period of 10 minutes. The exotherm of the reaction caused the temperature to rise to 110° C. When the reaction temperature started to drop, heat was applied, and the reaction mixture was kept at 100° C. for an additional 2 hours. At the end of this period, the reaction mixture was cooled to 70° C. and poured into 200 ml. of 1 N H$_2$SO$_4$. The phenol layer was separated, and phenol distilled off. From the distillation residue 7.6 g. of 2,4'-dihydroxybiphenyl was obtained by sublimation at 175° C. This material had a M.P. of 158–161° C. (Literature M.P. 161° C.—Beilstein VI, 990 [1923]). The diacetate derivative of this material had a M.P. of 94° C. (Literature M.P. 94° C. for the diacetate derivative of 2,4'-dihydroxybiphenyl—Beilstein VI, 990 [1923]).

What is claimed is:

1. A method for preparing bis (amino arenes) which comprises contacting as the sole reactant, an aryl alkylamine having from 6 to 14 aromatic ring carbon atoms and at least one unsubstituted ortho-para carbon atom, with an oxidizing amount of a chlorine containing transition metal oxidizer selected from the class consisting of chlorides of Group IV$b$ metals, chlorides of Group V$b$ metals, and oxychlorides of Group V$b$ metals, in order to effect aromatic ring coupling of said aryl amine.

2. The method claimed in claim 1 wherein the aryl alkylamine is an aryl monoalkylamine.

3. The method claimed in claim 2 wherein the aryl monoalkylamine is N-methylaniline.

4. The method claimed in claim 2 wherein the aryl alkylamine is an aryl dialkylamine.

5. The method claimed in claim 4 wherein the aryl dialkylamine is N,N-dimethylaniline.

6. The method claimed in claim 1 wherein the transition metal oxidizer is a chloride of a Group IV$b$ metal.

7. The method claimed in claim 6 wherein the Group IV$b$ metal is titanium.

8. The method claimed in claim 1 wherein the transition metal oxidizer is a chloride of a Group V$b$ metal.

9. The method claimed in claim 8 wherein the Group V$b$ metal is vanadium.

No references cited.

CHARLES B. PARKER, *Primary Examiner.*

R. L. RAYMOND, *Assistant Examiner.*

U.S. Cl. X.R.

260—619, 620